US008326511B2

(12) United States Patent
Shibata et al.

(10) Patent No.: US 8,326,511 B2
(45) Date of Patent: Dec. 4, 2012

(54) SYSTEM AND METHOD FOR ESTIMATING TORQUE OUTPUT OF A HOMOGENEOUS CHARGE COMPRESSION IGNITION ENGINE

(75) Inventors: Jonathan T. Shibata, Whitmore Lake, MI (US); Allen B. Rayl, Waterford, MI (US); Andrew P. Bagnasco, Plymouth, MI (US); Jun-Mo Kang, Ann Arbor, MI (US); Peter Kafarnik, Eltville-Erbach (DE)

(73) Assignee: GM Global Technology Operations LLC

( * ) Notice: Subject to any disclaimer, the term of this patent is extended or adjusted under 35 U.S.C. 154(b) by 446 days.

(21) Appl. No.: 12/732,669

(22) Filed: Mar. 26, 2010

(65) Prior Publication Data

US 2011/0238280 A1    Sep. 29, 2011

(51) Int. Cl.
*G06F 7/02* (2006.01)
*G06F 7/00* (2006.01)

(52) U.S. Cl. .......................................... 701/84; 701/54
(58) Field of Classification Search .......... 701/101–105, 701/54, 84; 123/295, 305, 430, 406.23; 73/114.11, 73/114.15
See application file for complete search history.

(56) References Cited

U.S. PATENT DOCUMENTS

2009/0229562 A1* 9/2009 Ramappan et al. ........... 123/295
2010/0057325 A1* 3/2010 Livshiz et al. ................. 701/102

* cited by examiner

*Primary Examiner* — Mahmoud Gimie (57) ABSTRACT

A control system for a homogeneous charge compression ignition (HCCI) engine includes a fuel requirement estimation module, a torque estimation module, and a torque control module. The fuel requirement estimation module estimates a fuel requirement of the HCCI engine based on a desired indicated mean effective pressure (IMEP) of cylinders in the HCCI engine. The torque estimation module estimates a torque output of the HCCI engine based on the estimated fuel requirement. The torque control module adjusts the torque output of the HCCI engine based on the estimated torque output and a desired torque output.

20 Claims, 5 Drawing Sheets

SYSTEM AND METHOD FOR ESTIMATING TORQUE OUTPUT OF A HOMOGENEOUS CHARGE COMPRESSION IGNITION ENGINE

FIELD

The present disclosure relates to internal combustion engines, and more particularly to a system and method for estimating torque output of a homogeneous charge compression ignition (HCCI) engine.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Homogeneous charge compression ignition (HCCI) engines combust an air and fuel (A/F) mixture within cylinders to drive pistons and generate drive torque. HCCI engines may operate in a spark ignition (SI) combustion mode or an HCCI combustion mode to ignite the A/F mixture. Additionally, HCCI engines may operate in a mixed combustion mode that includes HCCI combustion with spark assist. For example, one of the SI combustion mode, the mixed combustion mode, and the HCCI combustion mode may be selected based on engine speed and/or engine load.

More specifically, the SI combustion mode ignites the A/F mixture in the cylinders using spark (e.g., from spark plugs). The HCCI combustion mode, on the other hand, ignites the A/F mixture by compressing the A/F mixture to a point of automatic ignition. In other words, an increase in temperature and/or pressure of the A/F mixture may result in ignition of the A/F mixture.

In the HCCI combustion mode, however, ignition may occur at several different locations at a time. In other words, the A/F mixture may burn nearly simultaneously. Therefore, the HCCI combustion mode performs close to an ideal combustion cycle (e.g., the Otto cycle). The near ideal combustion may result in increased fuel economy and/or decreased emissions compared to the SI combustion mode. The HCCI combustion mode, however, may be more difficult to control (and thus less stable) due to the lack of a direct initiator of combustion.

SUMMARY

A control system for a homogeneous charge compression ignition (HCCI) engine includes a fuel requirement estimation module, a torque estimation module, and a torque control module. The fuel requirement estimation module estimates a fuel requirement of the HCCI engine based on a desired indicated mean effective pressure (IMEP) of cylinders in the HCCI engine. The torque estimation module estimates a torque output of the HCCI engine based on the estimated fuel requirement. The torque control module adjusts the torque output of the HCCI engine based on the estimated torque output and a desired torque output.

A method for controlling a homogeneous charge compression ignition (HCCI) engine includes estimating a fuel requirement of the HCCI engine based on a desired indicated mean effective pressure (IMEP) of cylinders in the HCCI engine, estimating a torque output of the HCCI engine based on the estimated fuel requirement, and adjusting the torque output of the HCCI engine based on the estimated torque output and a desired torque output.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Engine control systems may control torque output of an engine to achieve a desired torque. For example, engine control system may control the torque output of the engine by estimating the torque output of the engine based on various measurable engine parameters and adjusting at least one of air, fuel, and spark accordingly. More specifically, an analytical torque model may relate the various engine parameters to the torque output of the engine. Different engine parameters, however, may be used to estimate the torque output of the engine depending on a method of combustion.

Typical engine control systems include torque models for spark ignition (SI) combustion or compression ignition (i.e., diesel) combustion. Homogeneous charge compression ignition (HCCI) engines, however, may operate in one of three combustion modes: SI combustion, HCCI combustion (similar to compression ignition, or diesel combustion), and a mixed combustion (i.e., HCCI combustion with spark assist). In other words, typical engine control systems may not accurately estimate torque output of an HCCI engine operating in the mixed combustion mode. Thus, typical HCCI engines may suffer from decreased fuel economy, decreased performance, and/or increased emissions while operating in the mixed combustion mode.

Therefore, a system and method is presented that more accurately estimates torque output of an HCCI engine operating in the mixed combustion mode. More specifically, the system and method may estimate the torque output of the HCCI engine based on engine speed (RPM), an amount of fuel (i.e., fuel mass), spark timing, and intake and exhaust camshaft phasers (ICAM, ECAM, respectively). Moreover, the system and method may estimate the torque output of the HCCI engine based on more than one model (e.g., SI and mixed mode) and average the two resulting torque estimates, such as during a transition between combustion modes. Furthermore, the system and method may then adjust the torque output of the engine (e.g., air, fuel, and/or spark) based on the estimated torque output and a desired torque output (i.e., corresponding to input from a driver).

Figure 1:
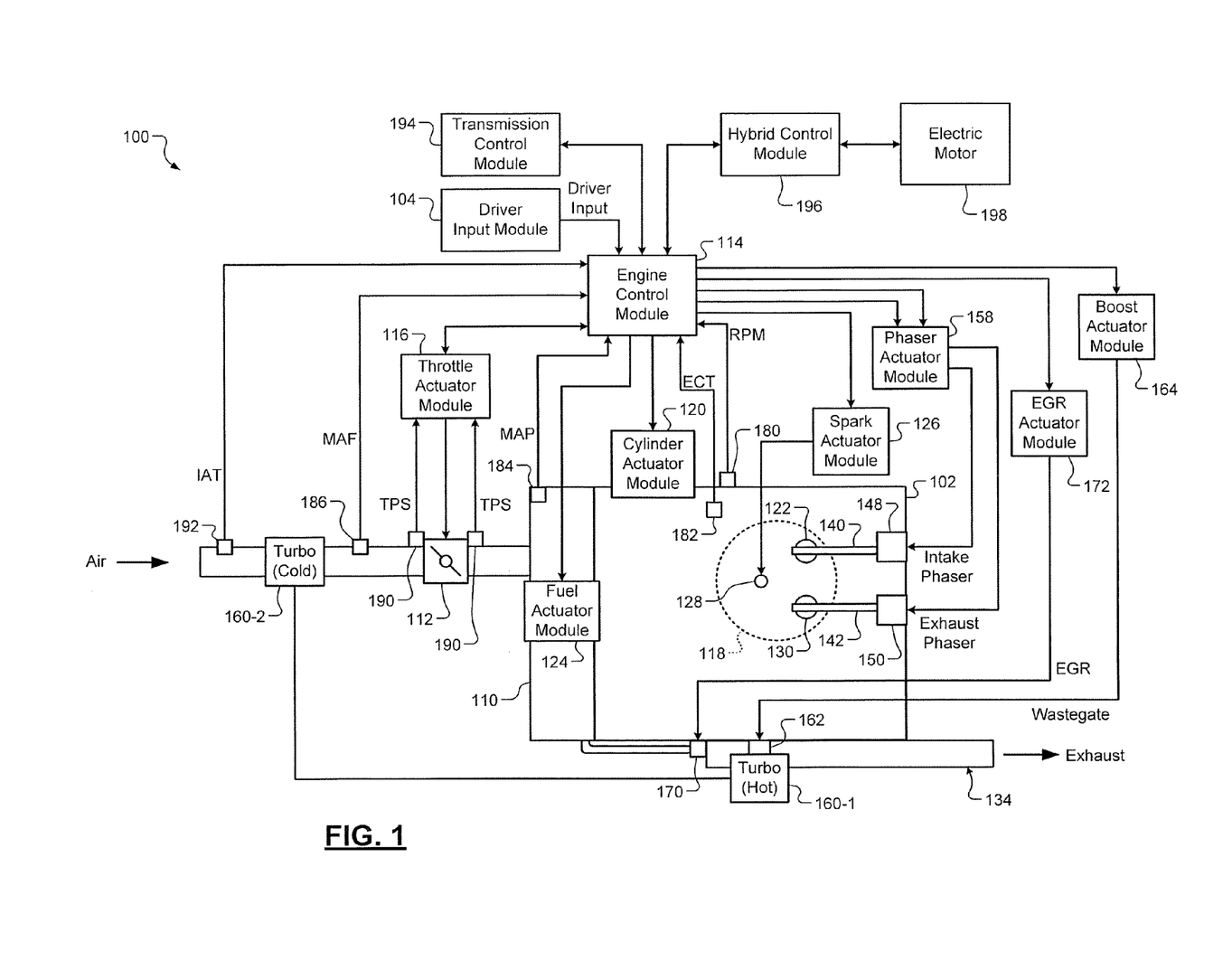
FIG. 1 is a functional block diagram of an exemplary homogeneous charge compression ignition (HCCI) engine system according to the present disclosure.

Referring now to FIG. 1, a functional block diagram of an exemplary HCCI engine system 100 is presented. The engine system 100 includes an HCCI engine 102 that combusts an air/fuel (A/F) mixture to produce drive torque for a vehicle based on driver input from a driver input module 104. Air is drawn into an intake manifold 110 through a throttle valve 112. For example only, the throttle valve 112 may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders, which may improve fuel economy under certain engine operating conditions.

The engine 102 may operate using a four-stroke cycle. The four strokes, described below, are named the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 114 controls a fuel actuator module 124, which regulates fuel injection to achieve a desired A/F ratio. Fuel may be injected into the intake manifold 110 at a central location or at multiple locations, such as near the intake valve 122 of each of the cylinders. In various implementations (not shown), fuel may be injected directly into the cylinders or into mixing chambers associated with the cylinders. The fuel actuator module 124 may halt injection of fuel to cylinders that are deactivated.

The injected fuel mixes with air and creates an A/F mixture in the cylinder 118. During the compression stroke, a piston (not shown) within the cylinder 118 compresses the A/F mixture. Based on a signal from the ECM 114, a spark actuator module 126 energizes a spark plug 128 in the cylinder 118, which ignites the A/F mixture. The timing of the spark may be specified relative to the time when the piston is at its topmost position, referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with crankshaft angle. In various implementations, the spark actuator module 126 may halt provision of spark to deactivated cylinders.

Generating the spark may be referred to as a firing event. The spark actuator module 126 may have the ability to vary the timing of the spark for each firing event. In addition, the spark actuator module 126 may have the ability to vary the timing of the spark for a given firing event even when a change in the timing signal is received after the firing event immediately before the given firing event.

During the combustion stroke, the combustion of the A/F mixture drives the piston down, thereby driving the crankshaft. The combustion stroke may be defined as the time between the piston reaching TDC and the time at which the piston returns to bottom dead center (BDC).

During the exhaust stroke, the piston begins moving up from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118).

The cylinder actuator module 120 may deactivate the cylinder 118 by disabling opening of the intake valve 122 and/or the exhaust valve 130. In various other implementations, the intake valve 122 and/or the exhaust valve 130 may be controlled by devices other than camshafts, such as electromagnetic actuators.

The time at which the intake valve 122 is opened may be varied with respect to piston TDC by an intake cam phaser 148. The time at which the exhaust valve 130 is opened may be varied with respect to piston TDC by an exhaust cam phaser 150. A phaser actuator module 158 may control the intake cam phaser 148 and the exhaust cam phaser 150 based on signals from the ECM 114. When implemented, variable valve lift (not shown) may also be controlled by the phaser actuator module 158.

The engine system 100 may include a boost device that provides pressurized air to the intake manifold 110. For example, FIG. 1 shows a turbocharger including a hot turbine 160-1 that is powered by hot exhaust gases flowing through the exhaust system 134. The turbocharger also includes a cold air compressor 160-2, driven by the turbine 160-1, that compresses air leading into the throttle valve 112. In various implementations, a supercharger (not shown), driven by the crankshaft, may compress air from the throttle valve 112 and deliver the compressed air to the intake manifold 110.

A wastegate 162 may allow exhaust to bypass the turbine 160-1, thereby reducing the boost (the amount of intake air compression) of the turbocharger. The ECM 114 may control the turbocharger via a boost actuator module 164. The boost actuator module 164 may modulate the boost of the turbocharger by controlling the position of the wastegate 162. In various implementations, multiple turbochargers may be controlled by the boost actuator module 164. The turbocharger may have variable geometry, which may be controlled by the boost actuator module 164.

An intercooler (not shown) may dissipate some of the heat contained in the compressed air charge, which is generated as the air is compressed. The compressed air charge may also have absorbed heat from components of the exhaust system 134. Although shown separated for purposes of illustration, the turbine 160-1 and the compressor 160-2 may be attached to each other, placing intake air in close proximity to hot exhaust.

The engine system 100 may include an exhaust gas recirculation (EGR) valve 170, which selectively redirects exhaust gas back to the intake manifold 110. The EGR valve 170 may be located upstream of the turbocharger's turbine 160-1. The EGR valve 170 may be controlled by an EGR actuator module 172.

The engine system 100 may measure the speed of the crankshaft in revolutions per minute (RPM) using an RPM sensor 180. The temperature of the engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 may be measured using a manifold absolute pressure (MAP) sensor 184. In various implementations, engine vacuum, which is the difference between ambient air pressure and the pressure within the intake manifold 110, may be measured. The mass flow rate of air flowing into the intake manifold 110 may be measured using a mass air flow (MAF) sensor 186. In various implementations, the MAF sensor 186 may be located in a housing that also includes the throttle valve 112.

The throttle actuator module 116 may monitor the position of the throttle valve 112 using one or more throttle position sensors (TPS) 190. The ambient temperature of air being drawn into the engine 102 may be measured using an intake air temperature (IAT) sensor 192. The ECM 114 may use signals from the sensors to make control decisions for the engine system 100.

The ECM 114 may communicate with a transmission control module 194 to coordinate shifting gears in a transmission (not shown). For example, the ECM 114 may reduce engine torque during a gear shift. The ECM 114 may communicate with a hybrid control module 196 to coordinate operation of the engine 102 and an electric motor 198.

The electric motor 198 may also function as a generator, and may be used to produce electrical energy for use by vehicle electrical systems and/or for storage in a battery. In various implementations, various functions of the ECM 114, the transmission control module 194, and the hybrid control module 196 may be integrated into one or more modules.

Each system that varies an engine parameter may be referred to as an actuator that receives an actuator value. For example, the throttle actuator module 116 may be referred to as an actuator and the throttle opening area may be referred to as the actuator value. In the example of FIG. 1, the throttle actuator module 116 achieves the throttle opening area by adjusting an angle of the blade of the throttle valve 112.

Similarly, the spark actuator module 126 may be referred to as an actuator, while the corresponding actuator value may be the amount of spark advance relative to cylinder TDC. Other actuators may include the cylinder actuator module 120, the fuel actuator module 124, the phaser actuator module 158, the boost actuator module 164, and the EGR actuator module 172. For these actuators, the actuator values may correspond to number of activated cylinders, fueling rate, intake and exhaust cam phaser angles, boost pressure, and EGR valve opening area, respectively. The ECM 114 may control actuator values in order to cause the engine 102 to generate a desired engine output torque.

Figure 2:
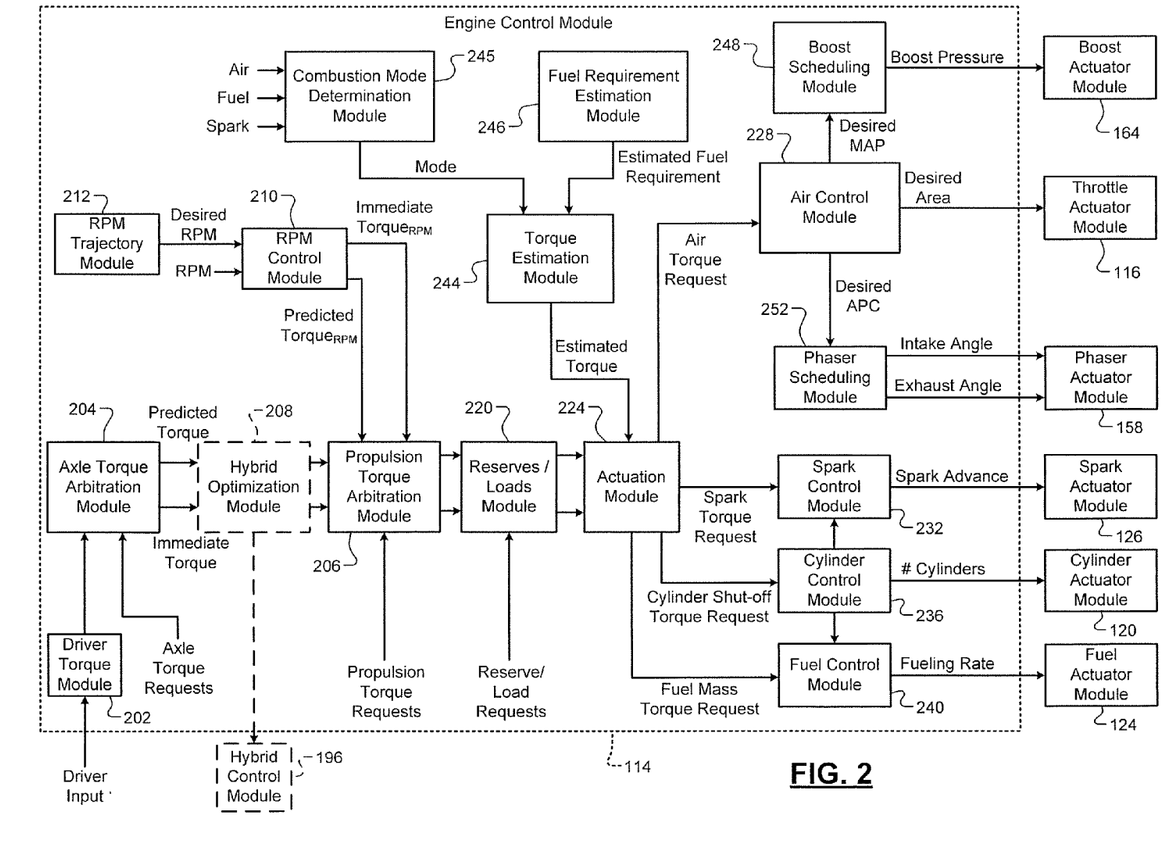
FIG. 2 is a functional block diagram of an exemplary engine control module (ECM) according to the present disclosure.

Referring now to FIG. 2, a functional block diagram of an exemplary engine control system is presented. An exemplary implementation of the ECM 114 includes a driver torque module 202. The driver torque module 202 may determine a driver torque request based on a driver input from the driver input module 104. The driver input may be based on a position of an accelerator pedal. The driver input may also be based on cruise control, which may be an adaptive cruise control system that varies vehicle speed to maintain a predetermined following distance. The driver torque module 202 may store one or more mappings of accelerator pedal position to desired torque, and may determine the driver torque request based on a selected one of the mappings.

An axle torque arbitration module 204 arbitrates between the driver torque request from the driver torque module 202 and other axle torque requests. Torque requests may include absolute torque requests as well as relative torque requests and ramp requests. For example only, ramp requests may include a request to ramp torque down to a minimum engine off torque or to ramp torque up from the minimum engine off torque. Relative torque requests may include temporary or persistent torque reductions or increases.

Axle torque requests may include a torque reduction requested by a traction control system when positive wheel slip is detected. Positive wheel slip occurs when axle torque overcomes friction between the wheels and the road surface, and the wheels begin to slip against the road surface. Axle torque requests may also include a torque increase request to counteract negative wheel slip, where a tire of the vehicle slips in the other direction with respect to the road surface because the axle torque is negative.

Axle torque requests may also include brake management requests and vehicle over-speed torque requests. Brake management requests may reduce engine torque to ensure that the engine output torque does not exceed the ability of the brakes to hold the vehicle when the vehicle is stopped. Vehicle over-speed torque requests may reduce the engine output torque to prevent the vehicle from exceeding a predetermined speed. Axle torque requests may also be generated by vehicle stability control systems.

The axle torque arbitration module 204 outputs a predicted torque request and an immediate torque request based on the results of arbitrating between the received torque requests. As described below, the predicted and immediate torque requests from the axle torque arbitration module 204 may selectively be adjusted by other modules of the ECM 114 before being used to control actuators of the engine 102.

In general terms, the immediate torque request is the amount of currently desired engine output torque, while the predicted torque request is the amount of engine output torque that may be needed on short notice. The ECM 114 therefore controls the engine 102 to produce an engine output torque equal to the immediate torque request. However, different combinations of actuator values may result in the same engine output torque. The ECM 114 may therefore adjust the actuator values to allow a faster transition to the predicted torque request, while still maintaining the engine output torque at the immediate torque request.

In various implementations, the predicted torque request may be based on the driver torque request. The immediate torque request may be less than the predicted torque request, such as when the driver torque request is causing wheel slip on an icy surface. In such a case, a traction control system (not shown) may request a reduction via the immediate torque request, and the ECM 114 reduces the torque produced by the engine 102 to the immediate torque request. However, the ECM 114 controls the engine 102 so that the engine 102 can quickly resume producing the predicted torque request once the wheel slip stops.

In general terms, the difference between the immediate torque request and the higher predicted torque request can be referred to as a torque reserve. The torque reserve represents the amount of additional torque that the engine 102 can begin to produce with minimal delay. Fast engine actuators are used to increase or decrease actual engine output torque. As described in more detail below, fast engine actuators are defined in contrast with slow engine actuators.

In various implementations, fast engine actuators are capable of varying engine output torque within a range, where the range is established by the slow engine actuators. In such implementations, the upper limit of the range is the predicted torque request, while the lower limit of the range is limited by the torque capacity of the fast actuators. For example only, fast actuators may only be able to reduce engine output torque by a first amount, where the first amount is a measure of the torque capacity of the fast actuators. The first amount may vary based on engine operating conditions set by the slow engine actuators. When the immediate torque request is within the range, fast engine actuators can be set to cause the engine output torque to be equal to the immediate torque request. When the ECM 114 requests the predicted torque request to be output, the fast engine actuators can be controlled to vary the engine output torque to the top of the range, which is the predicted torque request.

In general terms, fast engine actuators can more quickly change the engine output torque when compared to slow engine actuators. Slow actuators may respond more slowly to changes in their respective actuator values than fast actuators do. For example, a slow actuator may include mechanical components that require time to move from one position to another in response to a change in actuator value. A slow actuator may also be characterized by the amount of time it takes for the engine output torque to begin to change once the slow actuator begins to implement the changed actuator value. Generally, this amount of time will be longer for slow actuators than for fast actuators. In addition, even after beginning to change, the engine output torque may take longer to fully respond to a change in a slow actuator.

For example only, the ECM 114 may set actuator values for slow actuators to values that would enable the engine 102 to produce the predicted torque request if the fast actuators were set to appropriate values. Meanwhile, the ECM 114 may set actuator values for fast actuators to values that, given the slow actuator values, cause the engine 102 to produce the immediate torque request instead of the predicted torque request.

The fast actuator values therefore cause the engine 102 to produce the immediate torque request. When the ECM 114 decides to transition the engine output torque from the immediate torque request to the predicted torque request, the ECM 114 changes the actuator values for one or more fast actuators to values that correspond to the predicted torque request. Because the slow actuator values have already been set based on the predicted torque request, the engine 102 is able to produce the predicted torque request after only the delay imposed by the fast actuators. In other words, the longer delay that would otherwise result from changing engine output torque using slow actuators is avoided.

For example only, when the predicted torque request is equal to the driver torque request, a torque reserve may be created when the immediate torque request is less than the drive torque request due to a temporary torque reduction request. Alternatively, a torque reserve may be created by increasing the predicted torque request above the driver torque request while maintaining the immediate torque request at the driver torque request. The resulting torque reserve can absorb sudden increases in required engine output torque. For example only, sudden loads from an air conditioner or a power steering pump may be counterbalanced by increasing the immediate torque request. If the increase in immediate torque request is less than the torque reserve, the increase can be quickly produced by using fast actuators. The predicted torque request may then also be increased to re-establish the previous torque reserve.

Another example use of a torque reserve is to reduce fluctuations in slow actuator values. Because of their relatively slow speed, varying slow actuator values may produce control instability. In addition, slow actuators may include mechanical parts, which may draw more power and/or wear more quickly when moved frequently. Creating a sufficient torque reserve allows changes in desired torque to be made by varying fast actuators via the immediate torque request while maintaining the values of the slow actuators. For example, to maintain a given idle speed, the immediate torque request may vary within a range. If the predicted torque request is set to a level above this range, variations in the immediate torque request that maintain the idle speed can be made using fast actuators without the need to adjust slow actuators.

For example only, in a spark-ignition engine, spark timing may be a fast actuator, while throttle opening area may be a slow actuator. Spark-ignition engines may combust fuels including, for example, gasoline and ethanol, by applying a spark. By contrast, a compression-ignition engine may combust fuels including, for example, diesel, by compressing the fuels.

After receiving a new actuator value, the spark actuator module 126 may be able to change spark timing for the following firing event. When the spark timing (also called spark advance) for a firing event is set to a calibrated value, maximum torque is produced in the combustion stroke immediately following the firing event. However, a spark advance deviating from the calibrated value may reduce the amount of torque produced in the combustion stroke. Therefore, the spark actuator module 126 may be able to vary engine output torque as soon as the next firing event occurs by varying spark advance. For example only, a table of spark advances corresponding to different engine operating conditions may be determined during a calibration phase of vehicle design, and the calibrated value is selected from the table based on current engine operating conditions.

By contrast, changes in throttle opening area take longer to affect engine output torque. The throttle actuator module 116 changes the throttle opening area by adjusting the angle of the blade of the throttle valve 112. Therefore, once a new actuator value is received, there is a mechanical delay as the throttle valve 112 moves from its previous position to a new position based on the new actuator value. In addition, air flow changes based on the throttle valve opening are subject to air transport delays in the intake manifold 110. Further, increased air flow in the intake manifold 110 is not realized as an increase in engine output torque until the cylinder 118 receives additional air in the next intake stroke, compresses the additional air, and commences the combustion stroke.

Using these actuators as an example, a torque reserve can be created by setting the throttle opening area to a value that would allow the engine 102 to produce a predicted torque request. Meanwhile, the spark timing can be set based on an immediate torque request that is less than the predicted torque request. Although the throttle opening area generates enough air flow for the engine 102 to produce the predicted torque request, the spark timing is retarded (which reduces torque) based on the immediate torque request. The engine output torque will therefore be equal to the immediate torque request.

When additional torque is needed, such as when the air conditioning compressor is started, or when traction control determines wheel slip has ended, the spark timing can be set based on the predicted torque request. By the following firing event, the spark actuator module 126 may return the spark advance to a calibrated value, which allows the engine 102 to produce the full engine output torque achievable with the air flow already present. The engine output torque may therefore be quickly increased to the predicted torque request without experiencing delays from changing the throttle opening area.

The axle torque arbitration module 204 may output the predicted torque request and the immediate torque request to a propulsion torque arbitration module 206. In various implementations, the axle torque arbitration module 204 may output the predicted and immediate torque requests to a hybrid optimization module 208. The hybrid optimization module 208 determines how much torque should be produced by the engine 102 and how much torque should be produced by the electric motor 198. The hybrid optimization module 208 then outputs modified predicted and immediate torque requests to the propulsion torque arbitration module 206. In various implementations, the hybrid optimization module 208 may be implemented in the hybrid control module 196.

The predicted and immediate torque requests received by the propulsion torque arbitration module 206 are converted from an axle torque domain (torque at the wheels) into a propulsion torque domain (torque at the crankshaft). This conversion may occur before, after, as part of, or in place of the hybrid optimization module 208.

The propulsion torque arbitration module 206 arbitrates between propulsion torque requests, including the converted predicted and immediate torque requests. The propulsion torque arbitration module 206 generates an arbitrated predicted torque request and an arbitrated immediate torque request. The arbitrated torques may be generated by selecting a winning request from among received requests. Alternatively or additionally, the arbitrated torques may be generated by modifying one of the received requests based on another one or more of the received requests.

Other propulsion torque requests may include torque reductions for engine over-speed protection, torque increases for stall prevention, and torque reductions requested by the transmission control module 194 to accommodate gear shifts. Propulsion torque requests may also result from clutch fuel cutoff, which reduces the engine output torque when the driver depresses the clutch pedal in a manual transmission vehicle to prevent a flare (rapid rise) in engine speed.

Propulsion torque requests may also include an engine shutoff request, which may be initiated when a critical fault is detected. For example only, critical faults may include detection of vehicle theft, a stuck starter motor, electronic throttle control problems, and unexpected torque increases. In various implementations, when an engine shutoff request is present, arbitration selects the engine shutoff request as the winning request. When the engine shutoff request is present, the propulsion torque arbitration module 206 may output zero as the arbitrated torques.

In various implementations, an engine shutoff request may simply shut down the engine 102 separately from the arbitration process. The propulsion torque arbitration module 206 may still receive the engine shutoff request so that, for example, appropriate data can be fed back to other torque requestors. For example, all other torque requestors may be informed that they have lost arbitration.

An RPM control module 210 may also output predicted and immediate torque requests to the propulsion torque arbitration module 206. The torque requests from the RPM control module 210 may prevail in arbitration when the ECM 114 is in an RPM mode. RPM mode may be selected when the driver removes their foot from the accelerator pedal, such as when the vehicle is idling or coasting down from a higher speed. Alternatively or additionally, RPM mode may be selected when the predicted torque request from the axle torque arbitration module 204 is less than a calibratable torque value.

The RPM control module 210 receives a desired RPM from an RPM trajectory module 212, and controls the predicted and immediate torque requests to reduce the difference between the desired RPM and the actual RPM. For example only, the RPM trajectory module 212 may output a linearly decreasing desired RPM for vehicle coastdown until an idle RPM is reached. The RPM trajectory module 212 may then continue outputting the idle RPM as the desired RPM.

A reserves/loads module 220 receives the arbitrated predicted and immediate torque requests from the propulsion torque arbitration module 206. The reserves/loads module 220 may adjust the arbitrated predicted and immediate torque requests to create a torque reserve and/or to compensate for one or more loads. The reserves/loads module 220 then outputs the adjusted predicted and immediate torque requests to the actuation module 224.

For example only, a catalyst light-off process or a cold start emissions reduction process may require retarded spark advance. The reserves/loads module 220 may therefore increase the adjusted predicted torque request above the adjusted immediate torque request to create retarded spark for the cold start emissions reduction process. In another example, the A/F ratio of the engine and/or the mass air flow may be directly varied, such as by diagnostic intrusive equivalence ratio testing and/or new engine purging. Before beginning these processes, a torque reserve may be created or increased to quickly offset decreases in engine output torque that result from leaning the A/F mixture during these processes.

The reserves/loads module 220 may also create or increase a torque reserve in anticipation of a future load, such as power steering pump operation or engagement of an air conditioning (A/C) compressor clutch. The reserve for engagement of the A/C compressor clutch may be created when the driver first requests air conditioning. The reserves/loads module 220 may increase the adjusted predicted torque request while leaving the adjusted immediate torque request unchanged to produce the torque reserve. Then, when the A/C compressor clutch engages, the reserves/loads module 220 may increase the immediate torque request by the estimated load of the A/C compressor clutch.

An actuation module 224 receives the adjusted predicted and immediate torque requests from the reserves/loads module 220. The actuation module 224 determines how the adjusted predicted and immediate torque requests will be achieved. The actuation module 224 may be engine type specific. For example, the actuation module 224 may be implemented differently or use different control schemes for spark-ignition engines versus compression-ignition engines.

In various implementations, the actuation module 224 may define a boundary between modules that are common across all engine types and modules that are engine type specific. For example, engine types may include spark-ignition and compression-ignition. Modules prior to the actuation module 224, such as the propulsion torque arbitration module 206, may be common across engine types, while the actuation module 224 and subsequent modules may be engine type specific.

For example, in a spark-ignition engine, the actuation module 224 may vary the opening of the throttle valve 112 as a slow actuator that allows for a wide range of torque control. The actuator module 224 may disable cylinders using the cylinder actuator module 120, which also provides for a wide range of torque control, but may also be slow and may involve drivability and emissions concerns. The actuation module 224 may use spark timing as a fast actuator. However, spark timing may not provide as much range of torque control. In addition, the amount of torque control possible with changes in spark timing (referred to as spark reserve capacity) may vary as air flow changes.

In various implementations, the actuation module 224 may generate an air torque request based on the adjusted predicted torque request. The air torque request may be equal to the adjusted predicted torque request, setting air flow so that the adjusted predicted torque request can be achieved by changes to other actuators.

An air control module 228 may determine desired actuator values based on the air torque request. For example, the air control module 228 may control desired manifold absolute pressure (MAP), desired throttle area, and/or desired air per cylinder (APC). Desired MAP may be used to determine desired boost, and desired APC may be used to determine desired cam phaser positions. In various implementations, the air control module 228 may also determine an amount of opening of the EGR valve 170.

The actuation module 224 may also generate a spark torque request, a cylinder shut-off torque request, and a fuel mass torque request. The spark torque request may be used by a spark control module 232 to determine how much to retard the spark timing (which reduces engine output torque) from a calibrated spark advance.

The cylinder shut-off torque request may be used by a cylinder control module 236 to determine how many cylinders to deactivate. The cylinder control module 236 may instruct the cylinder actuator module 120 to deactivate one or more cylinders of the engine 102. In various implementations, a predefined group of cylinders may be deactivated jointly.

The cylinder control module 236 may also instruct a fuel control module 240 to stop providing fuel for deactivated cylinders and may instruct the spark control module 232 to stop providing spark for deactivated cylinders. In various implementations, the spark control module 232 only stops providing spark for a cylinder once any fuel/air mixture already present in the cylinder has been combusted.

In various implementations, the cylinder actuator module 120 may include a hydraulic system that selectively decouples intake and/or exhaust valves from the corresponding camshafts for one or more cylinders in order to deactivate those cylinders. For example only, valves for half of the cylinders are either hydraulically coupled or decoupled as a group by the cylinder actuator module 120. In various implementations, cylinders may be deactivated simply by halting provision of fuel to those cylinders, without stopping the opening and closing of the intake and exhaust valves. In such implementations, the cylinder actuator module 120 may be omitted.

The fuel control module 240 may vary the amount of fuel provided to each cylinder based on the fuel mass torque request from the actuation module 224. During normal operation of a spark-ignition engine, the fuel control module 240 may attempt to maintain a stoichiometric A/F ratio. The fuel control module 240 may therefore determine a fuel mass that will yield stoichiometric combustion when combined with the current amount of air per cylinder. The fuel control module 240 may instruct the fuel actuator module 124 to inject this fuel mass for each activated cylinder.

Based on the fuel mass torque request, the fuel control module 240 may adjust the A/F ratio with respect to stoichiometry to increase or decrease engine output torque. The fuel control module 240 may then determine a fuel mass for each cylinder that achieves the desired A/F ratio. In diesel systems, fuel mass may be the primary actuator for controlling engine output torque.

A mode setting may determine how the actuation module 224 treats the adjusted immediate torque request. The mode setting may be provided to the actuation module 224, such as by the propulsion torque arbitration module 206, and may select modes including an inactive mode, a pleasable mode, a maximum range mode, and an auto actuation mode.

In the inactive mode, the actuation module 224 may ignore the adjusted immediate torque request and set engine output torque based on the adjusted predicted torque request. The actuation module 224 may therefore set the spark torque request, the cylinder shut-off torque request, and the fuel mass torque request to the adjusted predicted torque request, which maximizes engine output torque for the current engine air flow conditions. Alternatively, the actuation module 224 may set these requests to predetermined (such as out-of-range high) values to disable torque reductions from retarding spark, deactivating cylinders, or reducing the fuel/air ratio.

In the pleasable mode, the actuation module 224 outputs the adjusted predicted torque request as the air torque request and attempts to achieve the adjusted immediate torque request by adjusting only spark advance. The actuation module 224 therefore outputs the adjusted immediate torque request as the spark torque request. The spark control module 232 will retard the spark as much as possible to attempt to achieve the spark torque request. If the desired torque reduction is greater than the spark reserve capacity (the amount of torque reduction achievable by spark retard), the torque reduction may not be achieved. The engine output torque will then be greater than the adjusted immediate torque request.

In the maximum range mode, the actuation module 224 may output the adjusted predicted torque request as the air torque request and the adjusted immediate torque request as the spark torque request. In addition, the actuation module 224 may decrease the cylinder shut-off torque request (thereby deactivating cylinders) when reducing spark advance alone is unable to achieve the adjusted immediate torque request.

In the auto actuation mode, the actuation module 224 may decrease the air torque request based on the adjusted immediate torque request. In various implementations, the air torque request may be reduced only so far as is necessary to allow the spark control module 232 to achieve the adjusted immediate torque request by adjusting spark advance. Therefore, in auto actuation mode, the adjusted immediate torque request is achieved while adjusting the air torque request as little as possible. In other words, the use of relatively slowly-responding throttle valve opening is minimized by reducing the quickly-responding spark advance as much as possible. This allows the engine 102 to return to producing the adjusted predicted torque request as quickly as possible.

A torque estimation module 244 may estimate torque output of the engine 102. This estimated torque may be used by the actuation module 224 to generate various requests corresponding to various engine operating parameters such as air, fuel, and spark. For example only, a torque relationship such as $$T = f(APC, S, I, E, AF, OT, \#) \quad (1)$$

may be defined, where torque (T) is a function of air per cylinder (APC), spark advance (S), intake cam phaser position (I), exhaust cam phaser position (E), A/F ratio (AF), oil temperature (OT), and number of activated cylinders (#). Additional variables may also be accounted for, such as the degree of opening of an exhaust gas recirculation (EGR) valve.

This relationship may be modeled by an equation and/or may be stored as a lookup table. However, the torque estimation module 244 may include more than one torque model and/or lookup table. For example, the torque estimation module 244 may include three different torque models for SI combustion, mixed mode combustion, and HCCI combustion.

A combustion mode determination module 245 may determine which combustion mode the HCCI engine 102 is currently operating in. In other words, the combustion mode determination module 245 may determine whether the HCCI engine 102 is operating in SI combustion mode, mixed combustion mode, or HCCI combustion mode. Additionally or alternatively, the combustion mode determination module 245 may also determine whether HCCI engine 102 is transitioning between combustion modes. For example, the combustion mode determination module 245 may determine the combustion mode of the HCCI engine based on at least one of air, fuel, cam profile, and spark supplied to the HCCI engine 102. For example only, the combustion mode determination module 245 may determine that the HCCI engine 102 is operating in the HCCI combustion mode when spark is disabled. The determined mode may be communicated to the torque estimation module 244 for use in estimating the torque output of the HCCI engine 102.

A fuel requirement estimation module 246 may estimate a fuel requirement of the HCCI engine 102. The estimated fuel requirement may be used to adjust fuel supplied to the HCCI engine 102, similar to torque modeling. However, the estimated fuel requirement may also be communicated to the torque estimation module 244 for use in estimating the torque output of the HCCI engine. For example, the estimated fuel requirement may provide for seamless transitions between SI combustion and HCCI combustion (and vice-versa) by reducing or eliminating abrupt torque changes.

The air control module 228 may output a desired area signal to the throttle actuator module 116. The throttle actuator module 116 then regulates the throttle valve 112 to produce the desired throttle area. The air control module 228 may generate the desired area signal based on an inverse torque model and the air torque request. The air control module 228 may use the estimated air torque and/or the MAF signal in order to perform closed loop control. For example, the desired area signal may be controlled to minimize a difference between the estimated air torque and the air torque request.

The air control module 228 may output a desired manifold absolute pressure (MAP) signal to a boost scheduling module 248. The boost scheduling module 248 uses the desired MAP signal to control the boost actuator module 164. The boost actuator module 164 then controls one or more turbochargers (e.g., the turbocharger including the turbine 160-1 and the compressor 160-2) and/or superchargers.

The air control module 228 may also output a desired air per cylinder (APC) signal to a phaser scheduling module 252. Based on the desired APC signal and the RPM signal, the phaser scheduling module 252 may control positions of the intake and/or exhaust cam phasers 148 and 150 using the phaser actuator module 158.

Referring back to the spark control module 232, calibrated spark advance values may vary based on various engine operating conditions. For example only, a torque relationship may be inverted to solve for desired spark advance. For a given torque request ($T_{des}$), the desired spark advance ($S_{des}$) may be determined based on $$S_{des} = T^{-1}(T_{des}, APC, I, E, AF, OT, \#). \quad (2)$$

This relationship may be embodied as an equation and/or as a lookup table. The A/F ratio (AF) may be the actual A/F ratio, as reported by the fuel control module 240.

When the spark advance is set to the calibrated spark advance, the resulting torque may be as close to mean best torque (MBT) as possible. MBT refers to the maximum engine output torque that is generated for a given air flow as spark advance is increased, while using fuel having an octane rating greater than a predetermined threshold and using stoichiometric fueling. The spark advance at which this maximum torque occurs is referred to as MBT spark. The calibrated spark advance may differ slightly from MBT spark because of, for example, fuel quality (such as when lower octane fuel is used) and environmental factors. The torque at the calibrated spark advance may therefore be less than MBT.

The air control module 228, the spark control module 232, the cylinder control module 236, the fuel control module 240, the boost scheduling module 248, and the phaser scheduling module 252 may be referred to collectively as a "torque control module." In other words, based on the torque requests and/or the estimated torque as previously described, the torque control module may control the torque output of the engine 102 by controlling air, spark, cylinders, fuel, boost, and/or phasers. However, while these modules may be referred to collectively as the torque control module, it can be appreciated that a separate torque control module may also be implemented in the ECM 114.

Figure 3:
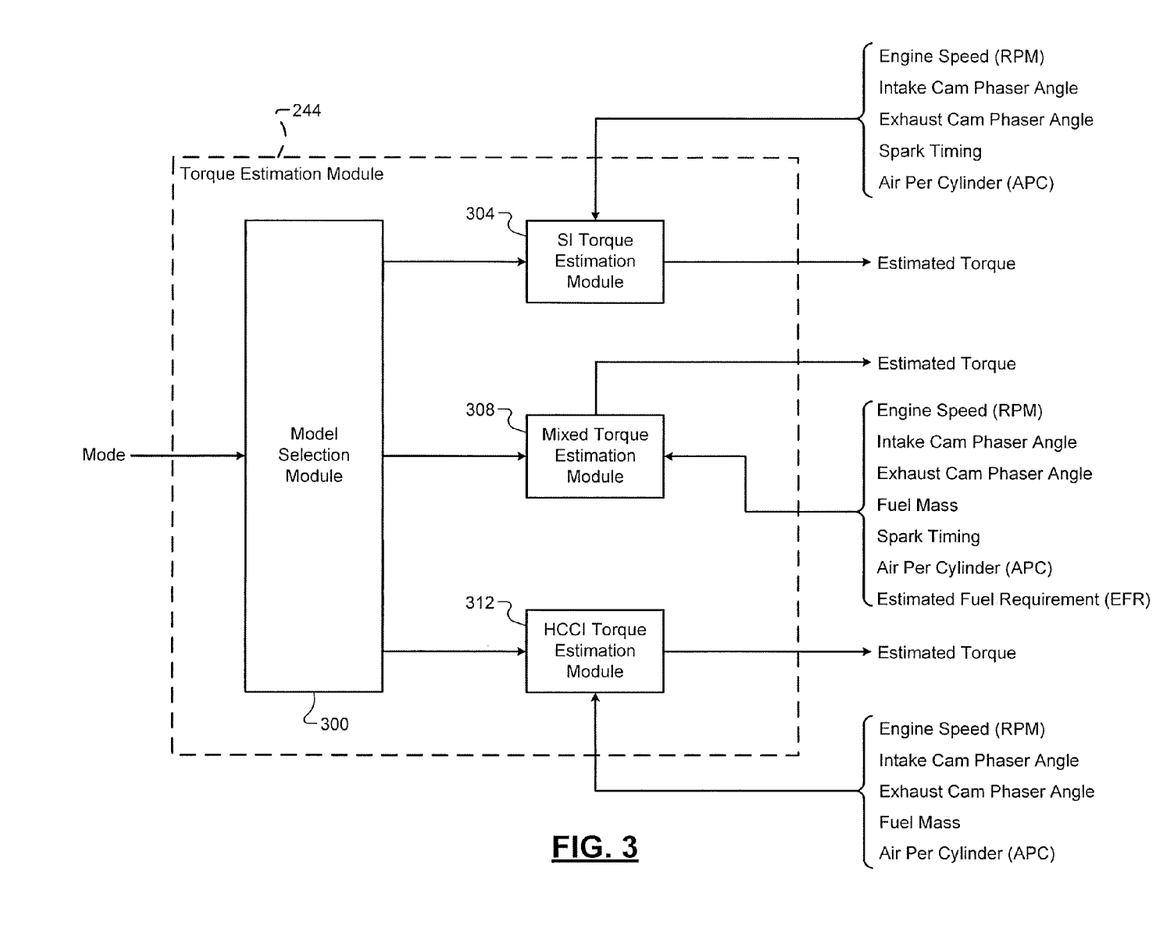
FIG. 3 is a functional block diagram of an exemplary torque estimation module according to the present disclosure.

Referring now to FIG. 3, the torque estimation module 244 is shown in more detail. The torque estimation module 244 may include a model selection module 300, an SI torque estimation module 304, a mixed torque estimation module 308, and an HCCI torque estimation module 312.

The model selection module 300 receives the combustion mode from the combustion mode determination module 245. For example, the combustion mode may be one of SI combustion, mixed mode combustion, and HCCI combustion. Thus, the model selection module 300 selects one of three analytical torque models based on the mode. Specifically, the model selection module 300 may select one of an SI torque model, a mixed torque model, and an HCCI torque model. In other words, the model selection module 300 may generate an enable signal for one of the SI torque estimation module 304, the mixed torque estimation module 308, and the HCCI torque estimation module 312. For example, the model selection module 300 may generate an enable signal for the SI torque estimation module 304 when the mode is SI combustion. Similarly, the model selection module 300 may generate an enable signal for the mixed torque estimation module 308 when the mode is mixed mode combustion, and may generate an enable signal for the HCCI torque estimation module 312 when the mode is HCCI combustion.

In other words, the torque estimation module 244 may generate one estimated torque output according to the selected torque model. Alternatively, however, the model selection module 300 may enable more than one of the SI torque estimation module 304, the mixed torque estimation module 308, and the HCCI torque estimation module 312. For example, the model selection module 300 may select two models (thus enabling two of the three torque estimation modules 304, 308, and 312) when the HCCI engine 102 is transitioning between combustion modes. The two generated torque estimations may then be averaged during the transition between combustion modes to help facilitate a seamless transfer by advancing the position of corresponding actuators. Moreover, in one embodiment the model selection module 300 may select all three models (thus enabling each of the three torque estimation modules 304, 308, 312) and average the three generated torque estimations. Alternatively, the model selection module 300 may perform a weighted average of the three torque estimations from the three torque estimation modules 304, 308, 312, respectively.

As previously described, the SI torque estimation module 304 may receive an enable signal from the model selection module 300. The SI torque estimation module 304 may also receive a first plurality of engine operating parameters. For example, the first plurality of engine operating parameters may include, but is not limited to, engine speed (RPM), intake and exhaust camshaft phaser angles, spark timing, and air per cylinder (APC). When enabled, the SI torque estimation module 304 estimates the torque output of the HCCI engine 102 based on the first plurality of engine operating parameters. In other words, the SI torque estimation module 304 may estimate the torque output of the HCCI engine 102 as follows:

$$T=f(R,S,I,E,APC),$$

where the estimated torque output (T) is a function of engine speed (RPM), spark timing (S), intake and exhaust camshaft phaser angles (I, E, respectively), and air per cylinder (APC). Alternatively or additionally, the estimated torque output T may be a function of the A/F ratio, oil temperature, and/or a number of activated cylinders.

The mixed torque estimation module 308 may also receive an enable signal from the model selection module 300. The mixed torque estimation module 308 may also receive a second plurality of engine operating parameters. For example, the second plurality of engine operating parameters may include, but is not limited to, engine speed (RPM), intake and exhaust camshaft phaser angles, fuel mass, spark timing, air per cylinder (APC), and an estimated fuel requirement (EFR). For example, the estimated fuel requirement EFR may be generated by the fuel requirement estimation module 246. When enabled, the mixed torque estimation module 308 estimates the torque output of the HCCI engine 102 based on the second plurality of engine operating parameters. In other words, the mixed torque estimation module 308 may estimate the torque output of the HCCI engine 102 as follows:

$$T=f(R,S,F,I,E,APC,EFR),$$

where the estimated torque output (T) is a function of engine speed (RPM), spark timing (S), fuel mass (F), intake and exhaust camshaft phaser angles (I, E, respectively), air per cylinder (APC), and the estimated fuel requirement (EFR). Additionally or alternatively, the estimated torque output T may be a function of fuel flow, fuel injection timing, and number of injections per engine cycle.

The HCCI torque estimation module 312 may also receive an enable signal from the model selection module 300. The HCCI torque estimation module 312 may also receive a third plurality of engine operating parameters. For example, the third plurality of engine operating parameters may include, but is not limited to, engine speed (RPM), intake and exhaust camshaft phaser angles, fuel mass, and air per cylinder (APC). When enabled, the HCCI torque estimation module 312 estimates the torque output of the HCCI engine 102 based on the third plurality of engine operating parameters. In other words, the HCCI torque estimation module 308 may estimate the torque output of the HCCI engine 102 as follows:

$$T=f(R,F,I,E,APC),$$

where the estimated torque output (T) is a function of engine speed (RPM), fuel mass (F), intake and exhaust camshaft phaser angles (I, E, respectively), and air per cylinder (APC). Alternatively or additionally, the estimated torque output T may be a function of fuel flow, fuel injection timing, and number of injections per engine cycle.

Figure 4:
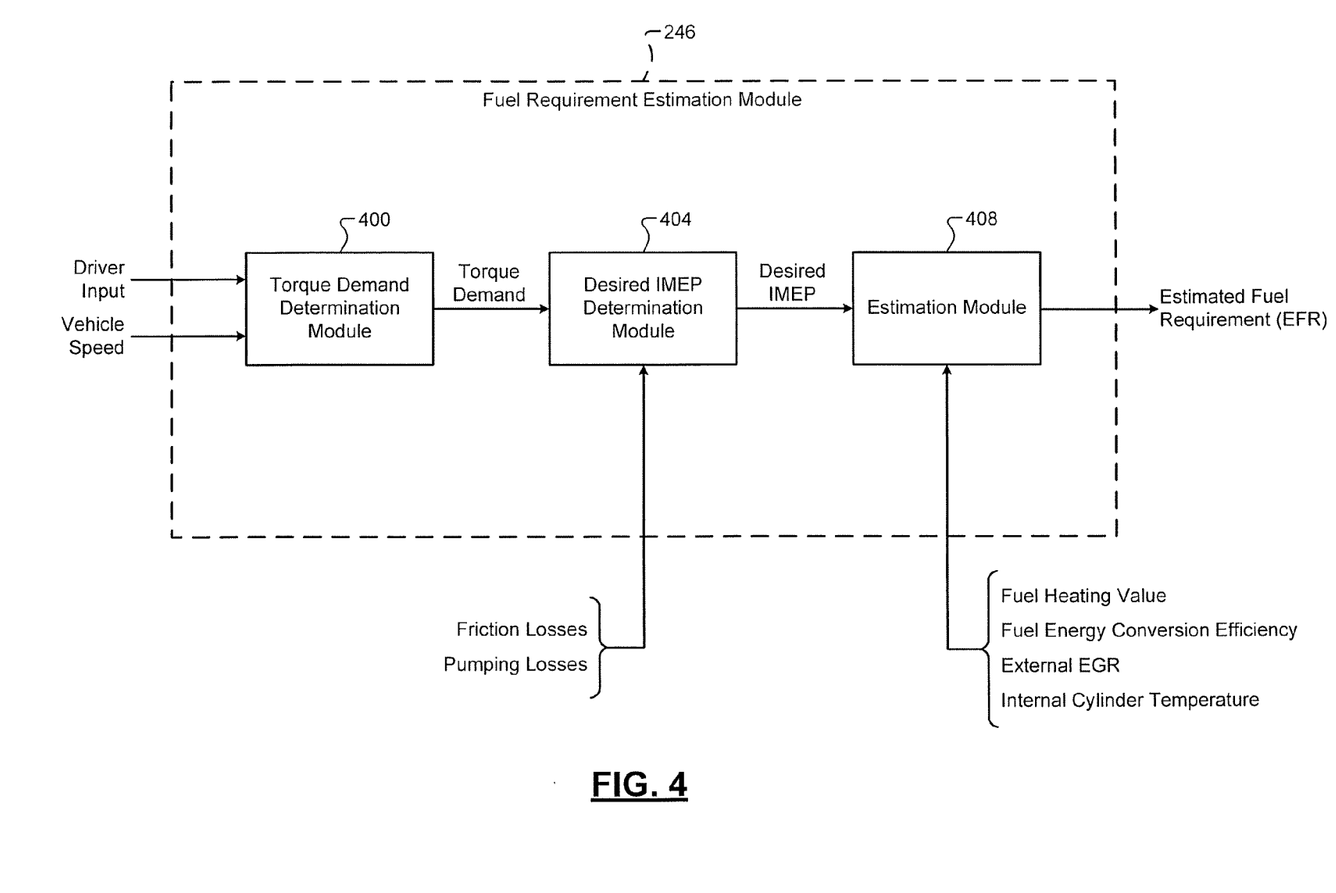
FIG. 4 is a functional block diagram of an exemplary fuel requirement estimation module according to the present disclosure.

Referring now to FIG. 4, the fuel requirement estimation module 246 is shown in more detail. The fuel requirement estimation module 246 may include a torque demand determination module 400, a desired indicated mean effective pressure (IMEP) determination module 404, and an estimation module 408. For example only, the torque demand determination module 400 may be the driver torque module 202. The torque demand determination module 400, however, may also be a separate module.

The torque demand determination module 400 receives a position of an accelerator and a vehicle speed. Additionally, the torque demand determination module 400 may communicate with a transmission to determine a current gear ratio. For example only, the accelerator may be an accelerator pedal and the position may correspond to a depression of the accelerator pedal. The torque demand determination module 400 determines an amount of torque demanded by the driver (i.e., a torque demand) based on the position of the accelerator and the vehicle speed.

The desired IMEP determination module 404 receives the torque demand. The desired IMEP determination module 404 may also receive signals indicating energy losses due to engine friction and engine pumping losses. The desired IMEP determination module 404 determines a desired IMEP of the HCCI engine based on the torque demand and the energy losses due to engine friction and pumping losses. In other words, the desired IMEP determination module 404 determines a mean effective pressure required to achieve the torque demand while compensating for both engine friction losses and engine pumping losses. For example, the desired IMEP may include an IMEP corresponding to the torque demand plus an IMEP corresponding to the engine friction and pumping losses.

The estimation module 408 receives the desired IMEP. The estimation module 408 may also receive a heating value of the fuel, an energy conversion efficiency of the fuel, an amount of external EGR, and a temperature inside the cylinders 118. The estimation module 408 estimates the fuel requirement of the HCCI engine 102. Rather, the estimation module 408 may generate the estimated fuel requirement (EFR) based on the desired IMEP, the fuel heating value, the fuel energy conversion efficiency, the external EGR amount, and the cylinder temperature. In other words, the estimation module 408 generates the EFR by compensating for specific chemical properties of the fuel. Thus, the estimation module 408 may generate the EFR more accurately. The more accurate EFR, therefore, may increase fuel economy, decrease emissions, and/or improve transitions between SI and HCCI combustion modes and vice-versa (e.g., noise, vibration, and/or harshness, or NVH characteristics).

Figure 5:
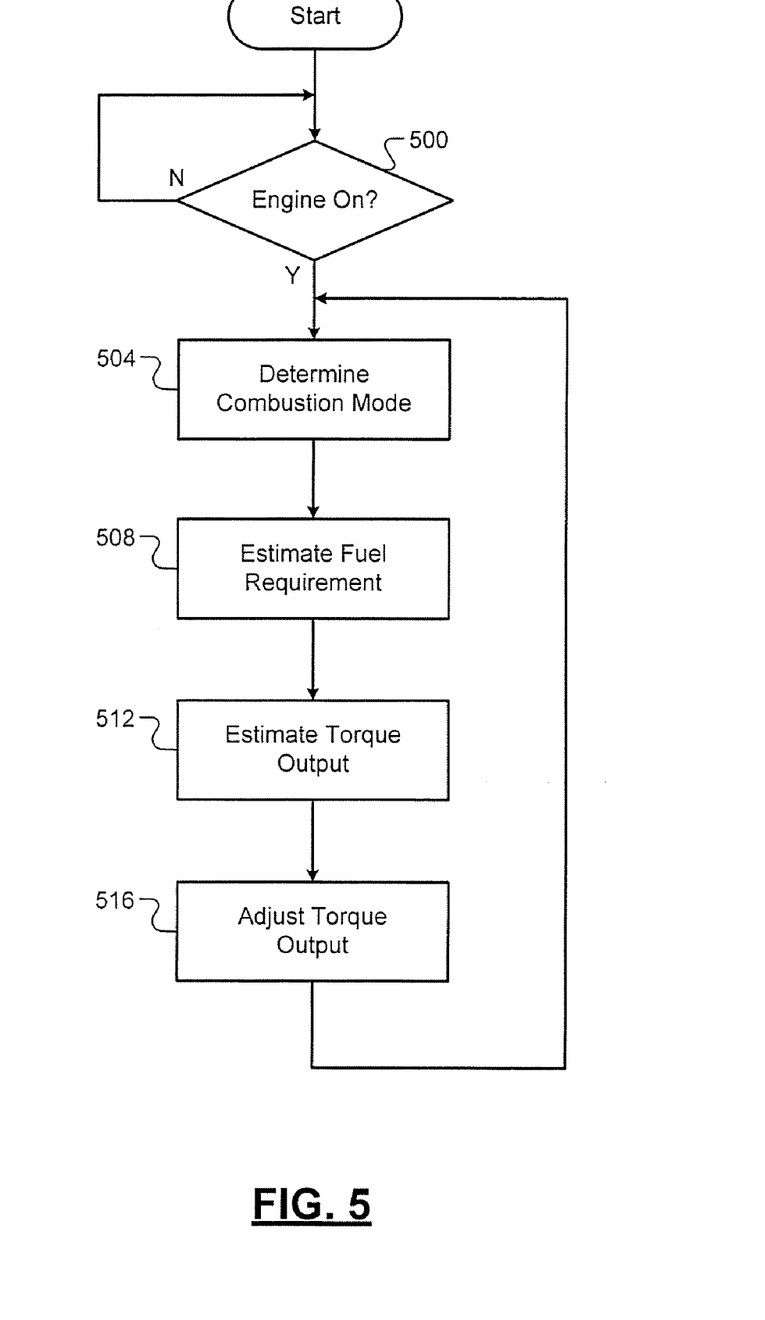
FIG. 5 is a flow diagram of an exemplary method for estimating torque output of an HCCI engine according to the present disclosure.

Referring now to FIG. 5, a method for estimating torque output of the HCCI engine 102 begins in step 500. In step 500, the ECM 114 determines whether the HCCI engine 102 is on (i.e., running). If true, control may proceed to step 504. If false, control may return to step 500.

In step 504, the ECM 114 determines which combustion mode the HCCI engine 102 is currently operating in. Additionally, the ECM 114 may determine whether the HCCI engine 102 is transitioning between combustion modes. In step 508, the ECM 114 estimates the fuel requirement of the HCCI engine 102.

In step 512, the ECM 114 estimates the torque output of the HCCI engine 102 based on the current combustion mode. Additionally, the ECM 114 may estimate the torque output of the HCCI engine 102 based on the estimated fuel requirement EFR of the HCCI engine 102. Furthermore, the ECM 114 may average multiple torque output estimates corresponding to different combustion modes, such as when the HCCI engine 102 is transitioning between combustion modes.

In step 516, the ECM 114 adjusts torque output of the HCCI engine 102 based on the desired torque output (i.e., driver input) and the estimated torque output of the HCCI engine 102. In other words, the ECM 114 may increase torque output when the estimated torque output is less than the desired torque output, or the ECM 114 may decrease torque output when the estimated torque output is greater than the desired torque output. For example, adjusting the torque output of the HCCI engine 102 may include controlling actuators to adjust air, fuel, and/or spark supplied to the HCCI engine 102. Control may then return to step 504.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control system for a homogeneous charge compression ignition (HCCI) engine, comprising:
    a fuel requirement estimation module that estimates a fuel requirement of the HCCI engine based on a desired indicated mean effective pressure (IMEP) of cylinders in the HCCI engine;
    a torque estimation module that estimates a torque output of the HCCI engine based on the estimated fuel requirement; and
    a torque control module that adjusts the torque output of the HCCI engine based on the estimated torque output and a desired torque output.

2. The control system of claim 1, further comprising:
    a desired IMEP determination module that determines the desired IMEP based on a torque demand, friction losses of the HCCI engine, and pumping losses of the HCCI engine.

3. The control system of claim 2, further comprising:
    a torque demand determination module that determines the torque demand based on input from a driver of a vehicle that includes the HCCI engine and a speed of the vehicle.

4. The control system of claim 3, further comprising:
    an estimation module that estimates the fuel requirement of the HCCI engine based on the desired IMEP, a heating value of a fuel supplied to the HCCI engine, an energy conversion efficiency of the fuel, an amount of external exhaust gas recirculation (EGR), and a temperature inside the cylinders of the HCCI engine.

5. The control system of claim 1, wherein the torque estimation module estimates the torque output of the HCCI engine when the HCCI engine is operating in a mixed combustion mode based on HCCI engine speed, an amount of fuel supplied to the HCCI engine, timing of spark supplied to the HCCI engine, angles of intake and exhaust camshaft phasers of the HCCI engine, and an amount of air supplied to the cylinders of the HCCI engine.

6. The control system of claim 1, wherein the torque estimation module estimates the torque output of the HCCI engine when the HCCI engine is operating in a spark ignition (SI) combustion mode based on HCCI engine speed, timing of spark supplied to the HCCI engine, angles of the intake and exhaust camshaft phasers of the HCCI engine, and an amount of air supplied to the cylinders of the HCCI engine.

7. The control system of claim 1, wherein the torque estimation module estimates the torque output of the HCCI engine when the HCCI engine is operating in an HCCI combustion mode based on HCCI engine speed, an amount of fuel supplied to the HCCI engine, angles of the intake and exhaust camshaft phasers of the HCCI engine, and an amount of air supplied to each cylinder of the HCCI engine.

8. The control system of claim 1, wherein the torque control module adjusts the torque output of the HCCI engine based on the desired torque output and two estimated torque outputs corresponding to two different combustion modes of the HCCI engine, when the HCCI engine is transitioning between the two different combustion modes.

9. The control system of claim 8, wherein the torque control module adjusts the torque output of the HCCI engine based on one of an average of and a weighted average of the two estimated torque outputs.

10. The control system of claim 1, wherein the torque control module adjusts the torque output of the HCCI engine based on one of an average of and a weighted average of three estimated torque outputs corresponding to SI combustion, mixed mode combustion, and HCCI combustion, respectively.

11. A method for controlling a homogeneous charge compression ignition (HCCI) engine, comprising:
    estimating a fuel requirement of the HCCI engine based on a desired indicated mean effective pressure (IMEP) of cylinders in the HCCI engine;
    estimating a torque output of the HCCI engine based on the estimated fuel requirement; and
    adjusting the torque output of the HCCI engine based on the estimated torque output and a desired torque output.

12. The method of claim 11, further comprising:
    determining the desired IMEP based on a torque demand, friction losses of the HCCI engine, and pumping losses of the HCCI engine.

13. The method of claim 12, further comprising:
    determining the torque demand based on input from a driver of a vehicle that includes the HCCI engine and a speed of the vehicle.

14. The method of claim 13, further comprising:
    estimating the fuel requirement of the HCCI engine based on the desired IMEP, a heating value of a fuel supplied to the HCCI engine, an energy conversion efficiency of the fuel, an amount of external exhaust gas recirculation (EGR), and a temperature inside the cylinders of the HCCI engine.

15. The method of claim 11, further comprising:
    estimating the torque output of the HCCI engine when the HCCI engine is operating in a mixed combustion mode based on HCCI engine speed, an amount of fuel supplied to the HCCI engine, timing of spark supplied to the HCCI engine, angles of intake and exhaust camshaft phasers of the HCCI engine, and an amount of air supplied to the cylinders of the HCCI engine.

16. The method of claim 11, further comprising:
    estimating the torque output of the HCCI engine when the HCCI engine is operating in a spark ignition (SI) combustion mode based on HCCI engine speed, timing of spark supplied to the HCCI engine, angles of the intake and exhaust camshaft phasers of the HCCI engine, and an amount of air supplied to the cylinders of the HCCI engine.

17. The method of claim 11, further comprising:
estimating the torque output of the HCCI engine when the HCCI engine is operating in an HCCI combustion mode based on HCCI engine speed, an amount of fuel supplied to the HCCI engine, angles of the intake and exhaust camshaft phasers of the HCCI engine, and an amount of air supplied to each cylinder of the HCCI engine.

18. The method of claim 11, further comprising:
adjusting the torque output of the HCCI engine based on the desired torque output and two estimated torque outputs corresponding to two different combustion modes of the HCCI engine, when the HCCI engine is transitioning between the two different combustion modes.

19. The method of claim 18, further comprising:
adjusting the torque output of the HCCI engine based on one of an average of and a weighted average of the two estimated torque outputs.

20. The method of claim 11, further comprising:
adjusting the torque output of the HCCI engine based on one of an average of and a weighted average of three estimated torque outputs corresponding to SI combustion, mixed mode combustion, and HCCI combustion, respectively.

* * * * *